(12) United States Patent
Wang et al.

(10) Patent No.: US 11,846,539 B2
(45) Date of Patent: Dec. 19, 2023

(54) METHOD AND SYSTEM FOR MEASURING INTERFERENCE IN A CHECKWEIGHING DEVICE

(71) Applicants: Mettler-Toledo (Changzhou) Precision Instruments Ltd, Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Shenhui Wang, Changzhou (CN); Huifang Wu, Changzhou (CN); Ming Cai, Changzhou (CN); Qi Han, Changzhou (CN); Dongjie Qiu, Changzhou (CN); Wenjun Jiang, Changzhou (CN); Jindong Cui, Changzhou (CN); Bin Zhu, Changzhou (CN)

(73) Assignees: Mettler-Toledo (Changzhou) Precision Instruments Ltd, Changzhou (CN); Mettler-Toledo (Changzhou) Measurement Technology Ltd., Changzhou (CN); Mettler-Toledo International Trading (Shanghai) Co., Ltd., Shanghai (CN)

(*) Notice: Subject to any disclaimer, the term of this patent is extended or adjusted under 35 U.S.C. 154(b) by 250 days.

(21) Appl. No.: 17/238,295

(22) Filed: Apr. 23, 2021

(65) Prior Publication Data

US 2021/0372847 A1 Dec. 2, 2021

(30) Foreign Application Priority Data

Apr. 30, 2020 (CN) .......................... 202010360584.9

(51) Int. Cl.
*G01G 11/00* (2006.01)
*G01G 15/00* (2006.01)
(Continued)

(52) U.S. Cl.
CPC .......... *G01G 15/006* (2013.01); *G01G 11/006* (2013.01); *G01G 19/387* (2013.01); *G01G 23/01* (2013.01)

(58) Field of Classification Search
CPC ...... G01G 1/006; G01G 15/006; G01G 23/01; G01G 19/387; G01G 19/393
See application file for complete search history.

(56) References Cited

U.S. PATENT DOCUMENTS 3,952,185 A * 4/1976 Stultz ....................... G06G 7/20
  702/179
4,529,050 A * 7/1985 Mosher ................ G01G 19/393
  177/1

(Continued)

FOREIGN PATENT DOCUMENTS

CN  107084776 B   4/2019
EP    2574887 A2  4/2013

*Primary Examiner* — Randy W Gibson
(74) *Attorney, Agent, or Firm* — Standley Law Group LLP; Jeffrey S. Standley; Adam J. Smith

(57) ABSTRACT

A method and a system measure interfering influences on a checkweighing device. In the method, external interference data are obtained, as are interference data from the checkweighing device itself and interference data from an object being weighed, by calculating or mapping the weighing error data in the stationary state, in the operating state, and in the weighing state. The system for measuring the interference uses a meter and a processing apparatus. The meter and the processing apparatus perform an interference measurement and a compensation method. The amount of interference in the checkweighing device in each state and the amount of influence of the interference on the weighing (Continued)

performance is obtained, thereby facilitating the production, debugging, maintenance, and use of a checkweighing device.

12 Claims, 1 Drawing Sheet

(51) Int. Cl.
*G01G 19/387* (2006.01)
*G01G 23/01* (2006.01)

(56) References Cited

U.S. PATENT DOCUMENTS

2013/0024152 A1* 1/2013 Hofmann ............. G01G 19/022
 702/101
2016/0018254 A1* 1/2016 Wechselberger .. G01G 23/3735
 177/1

* cited by examiner

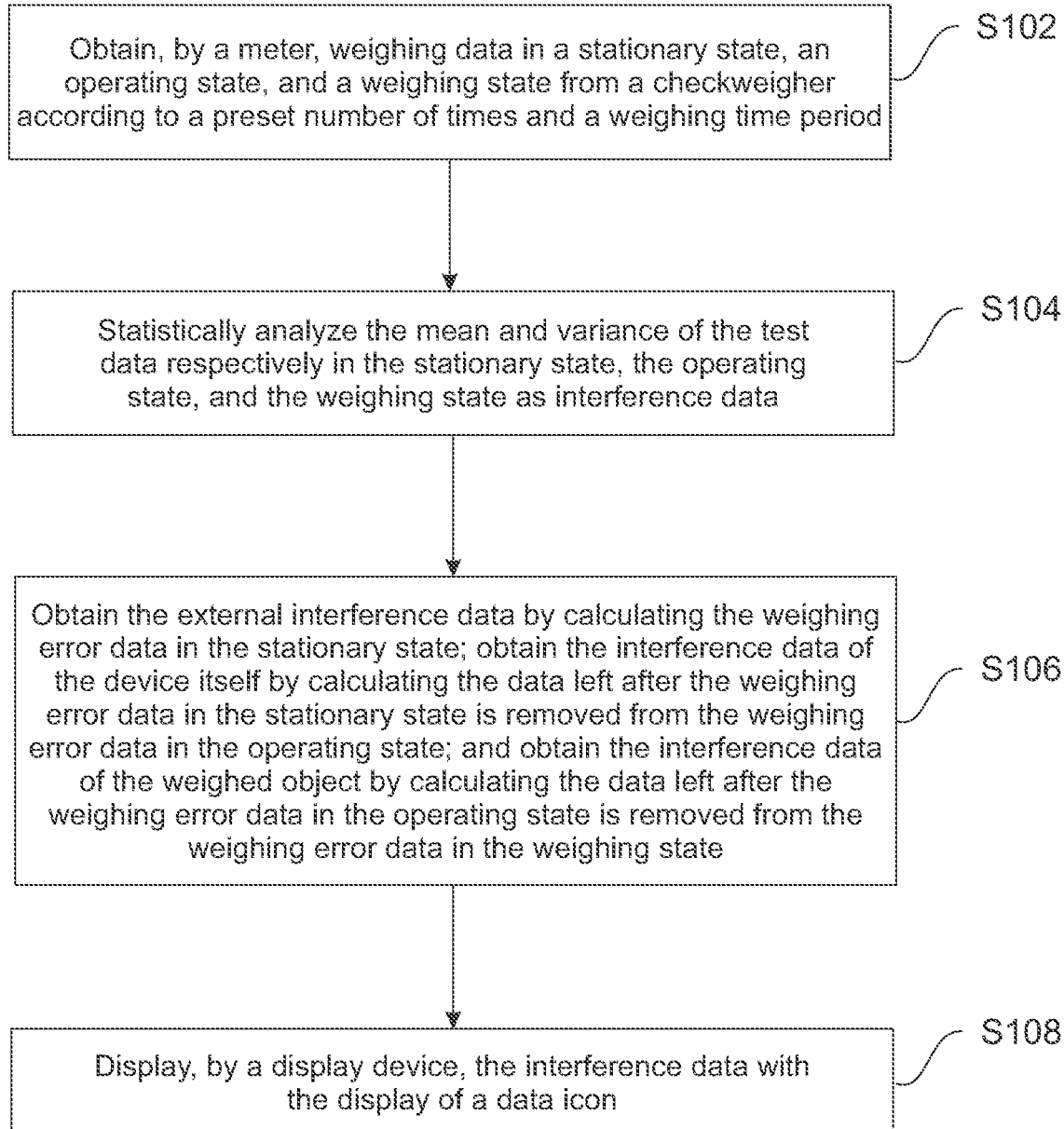

METHOD AND SYSTEM FOR MEASURING INTERFERENCE IN A CHECKWEIGHING DEVICE

CROSS-REFERENCE TO RELATED APPLICATIONS

This application is a non-provisional application that claims priority to Chinese application 202010360584.9, filed on 30 Apr. 2020, which is incorporated by reference as if fully recited herein.

TECHNICAL FIELD

The invention relates to a method and a system for measuring and compensating for the interference in a checkweighing device, using interference error data based on each of: the external environment, the components of the checkweighing device and an object being weighed on the checkweighing device.

BACKGROUND ART

After delivery and during on-site installation, a checkweighing device needs to be debugged and calibrated according to the on-site environmental conditions, so as to ensure that the checkweighing device operates normally and measures accurately when used by the customer.

The environmental conditions in actual production and use tend to vary significantly from site to site, which will cause interference in the accurate functioning of the checkweighing device. A variety of sources, and their influence on interference values needs to be studied for calibrating the checkweighing device accurately in actual production and use.

By distinguishing the sources of weighing interference in a checkweighing device, it is possible to compensate the weight values appropriately thus improving the device's performance. Primarily, the sources of interference may be divided into three types: the external environment, the moving components of the device itself, and the moving objects, all of which affect the checkweighing performance. Each of these sources of interference have varying degrees of influence on the checkweighing device in actual production and use scenarios. The existing checkweighing devices lack the ability to effectively detect and compensate for the influence of various types of interference on the performance of checkweighing devices.

SUMMARY

The technical problem to be solved is the absence of the ability to effectively detect and compensate for interference.in known prior art checkweighing devices. The inventive concept provides a method and a system that measure and compensate for the interference, by effectively distinguishing and quantitatively detecting three types of interference and their influence on the performance of the checkweighing device, thereby facilitating the production, debugging, maintenance, and use of the checkweighing device.

The present invention solves the above technical problem through the following technical solution in which a method for measuring the interference in a checkweighing device, the method comprising the steps of: obtaining weighing test data output by the checkweighing device after a preset weighing test time period according to a preset number of weighing tests in a stationary state, in an operating state, and in a weighing state respectively; obtaining, through statistical analysis, weighing error data in the stationary state, weighing error data in the operating state, and weighing error data in the weighing state, respectively; and obtaining external interference data, interference data of the checkweighing device, and interference data of a weighed object by calculating or mapping the weighing error data in the stationary state, the weighing error data in the operating state, and the weighing error data in the weighing state, respectively.

Preferably, the weighing test data is continuously output when the checkweighing device is in the stationary state and in the operating state. The weighing test data segments with durations equal to the preset weighing test time period are sequentially selected from the weighing test data in order of time, and the weighing test data segments with number same as the preset number of weighing tests is selected.

Further, the weighing test data segments selected from weighing test data are spaced from one another by a time interval. That is to say, when the weighing test data segments are selected, the weighing test data segments may not be continuous in time, and may also be spaced from one another by a specific time interval.

Further, when the weighing test data in the weighing state is statistically analyzed, a weight data of the weighed object is removed from the weighing test data, and a mean and/or variance of the weighing test data is statistically analyzed.

Preferably, the external interference data is obtained by calculating or mapping the weighing error data in the stationary state; the interference data of the checkweighing device is obtained by calculating or mapping a data obtained by removing the weighing error data in the stationary state from the weighing error data in the operating state; and the interference data of the weighed object is obtained by calculating or mapping a data obtained by removing the weighing error data in the operating state from the weighing error data in the weighing state; or the external interference data is obtained by calculating or mapping the weighing error data in the stationary state; the interference data of the checkweighing device is obtained by calculating or mapping the data obtained by removing the external interference data from the weighing error data in the operating state; and the interference data of the weighed object is obtained by calculating or mapping the data obtained by removing external interference data and the interference data of the checkweighing device from the weighing error data in the weighing state.

In another embodiment, the method for measuring the interference in a checkweighing device further comprises: calculating an interference compensation amount based on the external interference data, the interference data of the checkweighing device, and the interference data of the weighed object to compensate for a weighing result of the checkweighing device; or using the external interference data, the interference data of the checkweighing device itself, and the interference data of the weighed object as parameters of a checkweighing compensation model to correct a weighing result of the checkweighing device.

That is to say, in this embodiment, output data in a weighing process of the checkweighing device is corrected or compensated for by using the measured amount or intensity of three types of interference.

A system for measuring the interference in a checkweighing device comprises a meter and a processing apparatus. The meter, through measurement, obtains a weighing test data output by the checkweighing device after a preset weighing test time period repeatedly according to a preset number of weighing tests in a stationary state, an operating state, and a weighing state respectively. The processing apparatus statistically analyzes the weighing test data obtained from the meter to obtain weighing error data in each of the stationary state, the operating state, and the weighing state, and obtains external interference data, interference data of the checkweighing device, and interference data of a weighed object by calculating or mapping the weighing error data in the stationary state, the weighing error data in the operating state, and the weighing error data in the weighing state.

Preferably, the meter continuously obtains weighing test data from the checkweighing device when the checkweighing device is in the stationary state and in the operating state; and the processing apparatus or the meter sequentially selects, from the weighing test data, weighing test data segments with durations equal to a preset weighing test time period in order of time, and selects the weighing test data segments with number same as the preset number of weighing tests.

Further, the weighing test data segments selected by the processing apparatus or the meter are spaced from one another by a time interval.

Preferably, the system for measuring interference in a checkweighing device further comprises a display device for displaying the external interference data, the interference data of the checkweighing device, and the interference data of the weighed object that are obtained by the processing apparatus through calculation or mapping.

Preferably, the processing apparatus calculates an interference compensation amount based on the external interference data, the interference data of the checkweighing device, and the interference data of the weighed object to compensate for a weighing result of the checkweighing device; or the processing apparatus uses the external interference data, the interference data of the checkweighing device, and the interference data of the weighed object as parameters of a checkweighing compensation model to correct a weighing result of the checkweighing device.

A storage medium is characterized by a stored program that, when running, controls an apparatus where the storage medium is located to perform the method for measuring the interference as mentioned above.

The method and system improve the operability of the checkweighing device. In the inventive concept, the states of the checkweighing device are correlated with interference, so that the amount of interference in each state and the intensity of influence of the interference on the weighing performance are reflected by the difference in weighing precisions in all the states. This further facilitates the production, debugging, maintenance, and use of a checkweighing device.

By correlating the states of the checkweighing device with the interference, it is possible to detect and monitor the intensity and proportion of influence of three types of interference sources of a checkweighing device on the performance of the checkweighing device, and to pertinently compensate for the influence of the interference on checkweighing.

BRIEF DESCRIPTION OF THE DRAWING

The single drawing sheet accompanying this specification is a flowchart disclosing the method for measuring the interference in a checkweighing device.

DESCRIPTION OF EMBODIMENTS

The present invention will be further described below by way of examples, but the present invention is not therefore limited to the scope of the described embodiments.

The method for measuring the interference in a checkweighing device comprises the steps of: obtaining weighing test data output by the checkweighing device after a preset weighing test time period repeatedly according to a preset number of weighing tests in a stationary state, in an operating state, and in a weighing state respectively; obtaining, through statistical analysis, weighing error data in the stationary state, weighing error data in the operating state, and weighing error data in the weighing state, respectively; and obtaining external interference data, interference data of the checkweighing device itself, and interference data of a weighed object by calculating or mapping the weighing error data in the stationary state, the weighing error data in the operating state, and the weighing error data in the weighing state.

The stationary state refers to the state in which the checkweighing device does not operate and perform weighing. In this case, the checkweighing device can still detect the weight, so as to sequentially output the weighing test data obtained after a preset weighing test time period according to a specified number of times. The weighing test data output by the checkweighing device is the weight data output by the checkweighing device.

The operating state refers to the state in which the checkweighing device is normally operating, but no weighed object passes through the checkweighing device.

The weighing state refers to the state in which the checkweighing device is normally operating and performing weighing.

In the stationary state, the only substantial interference with the device is by the external environment. In the operating state, both the external environment and the movement of the components of the device itself interfere with the checkweighing device. In the weighing state, the external environment, the moving components of the device itself, and the moving objects all may interfere with the checkweighing device. By making use of the differences between the three states or scenarios in terms of interference, the magnitude and intensity of the three types of interference in the checkweighing device can be effectively measured through statistics and data processing, thereby facilitating not only the production, debugging, maintenance, and use of the checkweighing device but also further compensation processing.

In one embodiment, the meter obtains weighing data from the checkweighing device and sends the measured weighing data to a computer. The computer receives the weighing data, obtains data of the three types of interference in combination with a series of data collection procedures, and finally displays the interference data through a display. The system composed of the meter, the computer, and the display obtains and displays the data of the three types of interference by using the aforementioned method for measuring the interference.

In a weighing data acquisition step S102, the meter obtains the weighing data in the stationary state, in the operating state, and in the weighing state from the checkweighing device according to the preset number of times and a weighing time period.

Since the checkweighing device has three types of test states or scenarios i.e., the stationary state, the operating state (with no weighed object passing through the checkweighing device), and the weighing state (with a weighed object passing through the checkweighing device), the data collection procedure is also divided into three types of scenarios: the stationary state, the operating state (with no weighed object passing through the checkweighing device), and the weighing state (with a weighed object passing through the checkweighing device), and in each scenario, the weighing data needs to be collected for a predetermined time length or number of times.

In this embodiment, in each of the three states or scenarios, the number of weighing times and the duration of each weighing are the same i.e., the total weighing durations are the same. In this embodiment, the number of times is set to 20, the time length is set to 10 seconds, and the stationary state test data Ws[L] and the operating state test data Wr[M] are respectively obtained by means of testing in two test scenarios i.e. the stationary state and the operating state (with no weighed object passing through the checkweighing device). L and M are integers between 1 and 20. Moreover, each of the stationary state test data Ws[L] and the operating state test data Wr[M] is weighing data with a time length of 10 seconds.

In another embodiment, the meter obtains a segment of continuous weighing data with a time length over 20×10 seconds in two test scenarios i.e. the stationary state and the operating state (with no weighed object passing through the checkweighing device). Then, 20 segments of weighing data with a time length of 10 seconds are taken out from this segment of weighing data in the order of time, so as to constitute the stationary state test data Ws[L] and the operating state test data Wr[M].

In yet another variant example, the meter obtains a segment of continuous weighing data with a time length much longer than 20×10 seconds, for example, with a time length of 500 seconds or even longer. In addition, all the pieces of weighing data are spaced from one another by a time interval of at least 10 seconds when 20 segments of weighing data with a time length of 10 seconds are taken out. Further, the weighing data obtained at each weighing data acquisition time point is similar to the one obtained in the weighing state.

In the weighing state test scenario, that is, when the weighed object is loaded, the weighing test data are also acquired in 20 discrete pieces, each with a duration of 10 seconds, and the weighing state test data Ww_W[R] is finally obtained by means of testing, where R is an integer between 1 and 20.

In a weighing error data processing step S104, mean and variance of the test data in the stationary state, in the operating state, and in the weighing state are statistically analyzed as the weighing error data. In this embodiment, the mean and variance of the stationary state test data Ws[L], the operating state test data Wr[M], and the weighing state test data Ww_W[R] are statistically analyzed to obtain their respective mean data Ws_A, Wr_A, and Ww_A, and their respective variance data Ws_S, Wr_S, and Ww_S.

Because a weight is being applied to the checkweighing device in the weighing state, the weight data Ww_M[R] of the weighed object is subtracted from each of the weighing state test data Ww_W[R], before the mean and variance thereof are statistically analyzed.

Then, in an interference data calculation step S106, the external interference data are obtained by calculating the weighing error data in the stationary state. The interference data of the checkweighing device is obtained by subtracting the weighing error data in the stationary state from the weighing error data in the operating state. The interference data of the weighed object is obtained by removing the weighing error data in the operating state from the weighing error data in the weighing state.

In this embodiment, subtraction is performed on the mean and variance data of the test data in each state or scenario, so as to obtain the intensity of interference with weighing in each test state or scenario. Since the checkweighing device is subjected to minimal interference in the stationary state, the checkweighing device is subjected to significantly higher interference in the operating state as compared to that in the stationary state, and is subjected to maximum interference in the weighing state. Therefore, in this embodiment, the mean Ws_A and variance Ws_S of the test data in the stationary state are directly used as the external interference data. The difference between the mean Wr_A and variance Wr_S of the test data in the operating state and the mean Ws_A and variance Ws_S of the test data in the stationary state are used as the interference data of the checkweighing device. The difference between the mean Ww_A and variance Ww_S of the test data in the weighing state and the mean Wr_A and variance Wr_S of the test data in the operating state are used as the interference data of the weighed object. Further, the above-mentioned difference result is used to reflect the difference in interference among the various working scenarios.

In one variant example, the mean Ws_A and variance Ws_S of the test data in the stationary state are used to calculate the external interference data IWs. The external interference data IWs is subtracted from the mean Wr_A and variance Wr_S of the test data in the operating state to calculate the interference data IWr of the checkweighing device. The external interference data IWs and the interference data IWr of the checkweighing device are subtracted from the mean Ww_A and variance Ww_S of the test data in the weighing state to calculate the interference data IWw of the weighed object.

Then, in a displaying step S108, the display device displays the interference data with the display of a data icon.

In another embodiment, after the interference data calculation step S106, the computer calculates the interference compensation amount according to the calculated data of three types of interference by using the existing algorithm or formula, and compensates for the weighing result of the checkweighing device. In a variant example, the computer uses the data of the three types of interference as parameters of an algorithm model, such that the weighing result can be corrected by using the algorithm model to obtain a corrected weighing result.

It can be learned from the description of the procedure of the method for measuring the interference above that, a person skilled in the art may clearly understand that the present invention may be implemented by means of a software plus a necessary hardware platform. Based on such an understanding, the technical solution of the inventive concept, in essence or the contribution to the prior art, may be embodied in the form of a software product, and the computer software product may be stored in a storage medium, including but not limited to a ROM/RAM (Read-Only Memory/Random Access Memory), a magnetic disk, and an optical disk, which includes several instructions that cause one or more computer devices (which may be a personal computer, a server, or a network device) to carry out the methods described in various embodiments or some parts in the embodiment of the present invention.

The measurement and compensation procedures in the inventive concept may be described in a general context of a computer executable instruction executed by a computer, for example, a program module. Generally, the program module includes a program, an object, a component, a data structure, etc. for performing a specific task or implementing a specific abstract data type. The inventive concept may also be practiced in distributed computing environments where a task is performed by a remote processing device that is connected through a communications network. In the distributed computing environments, the program module may be located in local and remote computer storage media, including a storage device.

Although specific embodiments of the present invention have been described above, those skilled in the art should understand that these are merely examples, and the scope of protection of the present invention is defined by the appended claims. Those skilled in the art may make various changes or modifications to these embodiments without departing from the principles and essence of the present invention, but all these changes and modifications fall within the scope of protection of the present invention.

What is claimed is:

1. A method for measuring interference in a checkweighing device in an at least partially automated fashion, said method comprising the steps of:
   electronically obtaining weighing test data output from the checkweighing device after a weighing test time period of predetermined duration according to a predetermined number of weighing tests in each of: a stationary state of the checkweighing device, an operating state of the checkweighing device, and a weighing state of the checkweighing device;
   determining, through a computerized statistical analysis of the obtained weighing test data, weighing error data in each of: the stationary state, the operating state, and the weighing state;
   determining, by computerized calculating or mapping, interference data of: an external environment based on the weighing error data in the stationary state, components of the checkweighing device based on the weighing error data in the operating state, and an object being weighed based on weighing error data in the weighing state; and
   at least one of:
      calculating an interference compensation amount to compensate for a weighing result of the checkweighing device based on at least some of the interference data, and updating the weighing result based on the interference compensation amount; and
      using, as parameters of a checkweighing compensation model to correct a weighing result of the checkweighing device, the interference data, and correcting the weighting result in accordance with the checkweighing compensation model.

2. The method of claim 1, wherein:
   the weighing test data is output continuously by the checkweighing device in either the stationary state or the operating state; and
   the weighing test data is selected in segments, each segment having a duration equal to the predetermined weighing test time period, and the weighing test data segments are selected sequentially from the weighing test data in order of time, such that the weighing test data segments are equal in number to the predetermined number of weighing tests.

3. The method of claim 2, wherein the weighing test data segments selected from the weighing test data are spaced apart from one another by a time interval.

4. The method of claim 1, wherein:
   a weight of the object being weighed is subtracted from each of the weighing test data before determining either a mean or variance of the weighing test data.

5. The method of claim 1, wherein:
   in a first situation:
      the interference data of the external environment are obtained by calculating or mapping the weighing error data in the stationary state;
      the interference data of components of the checkweighing device are obtained by calculating or mapping data obtained by subtracting the weighing error data in the stationary state from the weighing error data in the operating state; and
      the interference data of the weighed object are obtained by calculating or mapping data obtained by subtracting the weighing error data in the operating state from the weighing error data in the weighing state; or
   in a second situation:
      the interference data of the external environment are obtained by calculating or mapping the weighing error data in the stationary state;
      the interference data of components of the checkweighing device are obtained by calculating or mapping data obtained after subtracting the interference data of the external environment from the weighing error data in the operating state; and
      the interference data of the weighed object are obtained by calculating or mapping data obtained after subtracting each of the interference data of the external environment and the interference data of components of the checkweighing device from the weighing error data in the weighing state.

6. The method of claim 1, wherein:
   the interference data in the step of at least one of calculating the interference compensation amount to compensate for the weighing result of the checkweighing device; and
   using, as parameters of the checkweighing compensation model to correct the weighing result of the checkweighing device comprises the interference data of each of: the external environment, the components of the checkweighing device, and the weighed object.

7. A system for measuring interference in a checkweighing device, said system comprising:
   a meter, configured to electronically obtain by measurement, a weighing test data output from the checkweighing device after a predetermined weighing test time period, repeatedly, and according to a predetermined number of weighing tests in each of: a stationary state, an operating state, and a weighing state; and
   a processing apparatus, configured to, in an at least partially automated fashion:
      statistically analyze the weighing test data obtained by the meter to obtain weighing error data in the stationary state, weighing error data in the operating state, and weighing error data in the weighing state,
      obtain, by calculating or mapping, interference data of the external environment using weighing error data in the stationary state, interference data of components of the checkweighing device using the weighing error data in the operating state, and interference data of a weighed object using the weighing error data in the weighing state, and
      at least one of:
         calculate an interference compensation amount based on the interference data of one or more of: the external environment, the components of the checkweighing device, and the weighed object to compensate for a weighing result of the checkweighing device, and update the weighing result based on the interference compensation amount; and use, as parameters of a checkweighing compensation model to correct the weighing result of the checkweighing device, the interference data of one or more of: the external environment, the components of the checkweighing device, and the weighed object, and update the weighing result based on the checkweighing compensation model.

8. The system of claim 7, wherein:

the meter continuously obtains weighing test data from the checkweighing device when the checkweighing device is in either the stationary state or in the operating state; and the processing apparatus or the meter sequentially selects, from the weighing test data, weighing test data segments with durations equal to a predetermined weighing test time period in order of time, and selects a number of the weighing test data segments that is the same as the predetermined number of weighing tests.

9. The system of claim 8, wherein the weighing test data segments, selected by the processing apparatus or the meter, are spaced apart from one another by a time interval.

10. The system of claim 8, further comprising:

a display device for displaying the interference data of the external environment, the interference data of components of the checkweighing device, and the interference data of the weighed object, which are obtained by the processing apparatus through calculation or mapping.

11. The system of claim 8, wherein:

the processing apparatus, if calculating the interference compensation amount uses the interference data of each of: the external environment, the components of the checkweighing device, and the weighed object; and the processing apparatus if using the interference data as the parameters of the checkweighing compensation model to correct the weighing result of the checkweighing device, uses the interference data of each of: the external environment, the components of the checkweighing device, and the weighed object.

12. A storage medium, characterized by comprising a stored program that, when running, controls an apparatus where the storage medium is located to perform the method for measuring the interference according to claim 1.

* * * * *